Feb. 4, 1969　　　　J. G. SIMS　　　　3,425,893
TEXTILE FILAMENTS
Filed Aug. 3, 1965

INVENTOR.
JAMES G. SIMS
BY
Stanley M. Tarter
ATTORNEY

Feb. 4, 1969 J. G. SIMS 3,425,893
TEXTILE FILAMENTS

Filed Aug. 3, 1965 Sheet 2 of 5

INVENTOR.
JAMES G. SIMS

BY *Stanley M. Tarter*

ATTORNEY

Feb. 4, 1969 — J. G. SIMS — 3,425,893
TEXTILE FILAMENTS
Filed Aug. 3, 1965

INVENTOR.
JAMES G. SIMS
BY Stanley M. Tarter
ATTORNEY

United States Patent Office 3,425,893
Patented Feb. 4, 1969

3,425,893
TEXTILE FILAMENTS
James G. Sims, 1818 E. Brainard, Pensacola, Fla. 32503
Continuation-in-part of application Ser. No. 249,822, Jan. 7, 1963. This application Aug. 3, 1965, Ser. No. 476,952
U.S. Cl. 161—177  8 Claims
Int. Cl. D01f 7/00; D02g 3/00

This application is a continuation-in-part application of application Ser. No. 249,822, filed Jan. 7, 1963, now abandoned.

The present invention relates to synthetic textile filaments and to spinnerets for the production of same. More particularly, the present invention relates to novel and useful melt spun non-circular section textile filaments having improved properties and to novel and useful spinnerets having unique orifice configurations adapted for producing said filaments.

Recently, it has become practical to alter the properties of melt spun textile filaments by modifying the cross-sectional shape of normally round filaments. Such modification imparts desired light reflective properties and greater cover to the filaments. It is known that cross sections of the modified filaments preferably have an odd number of sides and the highest degree of planar symmetry, as well as the highest multiple of axial symmetry, commensurable with the shape thereof in order to obtain maximum sparkle and uniformity of cover. The cross sections with an odd number of sides exhibit no radial symmetry. These elements of symmetry applied to filaments are defined in the same way as symmetry of crystals is defined in crystallography.

By degree of planar symmetry is meant the number of axes or straight lines that can be drawn in the plane of the filament cross section and that will divide the filament cross section into two equal parts, each being the mirror image of the other; or with reference to the filament, the number of planes which can be passed through the longitudinal axis of the filament to divide the filament into two equal parts, each part being the mirror image of the other. By this definition, a filament having an equilateral triangular cross section has three degrees of planar symmetry.

By multiple of axial symmetry is meant the number of times the filament presents the same appearance of lobes, lines, or angles during one complete rotation of the filament about its longitudinal axis when the filament is viewed from a fixed external position. By this definition, a filament having an equilateral triangular cross section uniformly along its length has threefold axial symmetry, since this filament presents the same aspect to view each time it is rotated through an angle of 120°, or it presents the same appearance three times in a complete rotation of 360°.

A plane closed geometrical figure is said to possess radial symmetry if there exists a point within the figure such that any straight line drawn through this point will intersect the boundary an even number of times, and the intercepts are of equal distance from the point; this inner point is usually the centroid or center of the plane figure. A circle for example has radial symmetry; any straight line through the center intersects the periphery in two points that are equidistant from the center (i.e., both line segments are equal to the radius of the circle).

In a recent disclosure a specific range of a class of planarly symmetrical trilobal filaments has been suggested for use in textile articles. Certain difficulties are encountered during production thereof by usual melt spinning techniques. In conventional melt spinning, streams of molten polymer under constant pressure issue from a spinneret and are directed vertically downward through a spinning or quenching chimney. In the chimney the streams become cool and solidify into individual filaments. Advantageous results are obtained when the directional movement of cooling air in the chimney is transverse with respect to the downward direction taken by the moving streams of polymer. Even by taking care that the initial air flow is uniform in magnitude and direction, it has been observed that during melt spinning of the known symmetrical trilobal section filaments the same develop a slight twist as they are drawn away from the spinneret. The precise mechanism inducing this twist is obscure; but the inception of the twist seems to be associated with a slight imbalance of aerodynamic forces acting on the filaments and/or stresses due to inequalities in the cooling of the filaments. Once a moderate degree of twist is present in the filaments, the forward movement thereof causes the filaments to rotate in the reverse direction. The forces involved are of very small magnitude; but, it has been found that several complete turns may develop before the torque is great enough to rearrange the filaments at the surface of the guide used to bring the filaments into a compact bundle after being cooled. There is, therefore, a continual build-up of twist followed by a release and recurrence thereof during spinning of the planarly symmetrical trilobal filaments. The twisting is relatively random and causes fluctuations in filament tension in the spinning chimney. Such irregular tensions are causally related to the presenec of dye streaks manifested in woven fabrics made from normal symmetrical trilobal filaments produced by usual melt spinning techniques.

An object of the present invention is to provide synthetic textile filaments of non-circular cross sections which are more uniformly aerodynamically stable during melt spinning thereof and which exhibit enhanced resiliency.

A further object is to provide a spinneret plate adapted for use in making filaments of non-circular cross sections exhibiting enhanced resiliency and more uniform areodynamical stability during melt spinning thereof.

The objects of the present invention generally are accomplished in the provision of particular textile filaments having cross sections with three, five, seven, or nine lobes. Each of the lobes of the filaments is substantially equally spaced about the center thereof. The lobes are substantially uniformly bent in one direction. In addition, the filaments have a corresponding multiple of axial symmetry and present neither planar symmetry nor radial symmetry. The invention further provides spinnerets having unique orifice configurations adapted to make such types of filaments.

The filaments of the present invention are made from synthetic thermoplastic polymer capable of being melt spun into strands. A threadline composed of a plurality of such filaments is more amenable to being textured by conventional procedures. Especially, a threadline thereof can be advantageously textured by the use of a plasticizing fluid while the yarn is under low tension in accordance with known techniques. Furthermore, a threadline composed of filaments described herein can be textured better than the known planarly symmetrical trilobal filaments when the known hot-stretch gear-quench texturing procedure is employed.

A threadline composed of a plurality of the present filaments wherein a porton, preferably at least 10 percent, of the filaments have their branches inclined in a direction opposite to the other filaments exhibits a distinctly different natural bulk as compared to a threadline composed only of filaments having their branches inclined together in the same direction.

A preferred filament has three branches conforming to a triskelion shape in that each of the three distal ends of the branches is substantially uniformly curved or bent in one direction in a pinwheel like fashion. The filament is particularly characterized by having threefold axial symmetry and presenting neither planar nor radial symmetry. Further, it is preferred that the triskelion section filament have a deviation coefficient of 1.10 to 1.85, as subsequently defined.

In addition to the triskelion section filaments, the filaments can have five, seven, or nine lobes each. Also in these cases, each of the distal ends of the lobes is substantially uniformly curved or bent in one direction.

The preferred degree of shape definition for each type of filament of the present invention in terms of deviation coefficient and symmetry is summarized in the following table:

TABLE 1

| No. of Lobes | Symmetry | Deviation Coefficient |
| --- | --- | --- |
| 3 | 3-fold axial | 1.10–1.85 |
| 5 | 5-fold axial | 1.10–1.75 |
| 7 | 7-fold axial | 1.15–1.70 |
| 9 | 9-fold axial | 1.20–1.65 |

The corresponding spinneret plate is novel per se and is adapted for melt spinning skewed multi-lobular section filaments from spinnable melts. The spinneret plate has a melt face and an extrusion face; a bounding wall defines a passageway for molten polymer between the faces and forms at the extrusion face a multi-branched slot. A distinct feature of the spinneret plate is that the end portions of the branches of the slot are inclined together in one direction, relative to the respective central portions of the branches.

The spinneret plates can be provided with any suitable number of orifices and can be constructed of any suitable material such as stainless steel or the like. The plate should be of sufficient thickness to withstand the extrusion pressures employed.

In one preferred embodiment the bounding wall defining the polymer passageway forms at the extrusion face three connected elongated branches. From their point of connection the branches extend along radial lines for about 30 percent to 65 percent of their lengths and then extend together in one direction angled from the radial line by about 20° to 80° (offset angle). In a second embodiment the slots are substantially arcuately curved together in one direction and subtend a central angle of 130° to 200°.

The spinneret orifices required to produce triskelion filaments within the prescribed ranges will have a deviation coefficient within the range of 2.2 to 4.2 as defined below. For best results the slot width of the orifice will not exceed 0.007 inch and is preferably in the range of 0.0025 to 0.005 inch; however, the actual dimensions will depend upon the desired filament denier, spinning speed, polymer viscosity, and other process variables. The open cross section of the orifice may be as great as 0.003 square inch for bristle production or for very high viscosity melts; but for most textile spinning, an area of 0.0003 to 0.001 square inch is preferred. The orifices can be arranged to produce a threadline in which the filaments are all left-hand triskelion section filaments, or all right-hand triskelion section filaments, or both right-hand and left-hand mixed in any proportion.

In addition to spinnerets adapted for making triskelion section filaments, the present invention includes spinnerets for making filaments having five, seven, and nine lobes. Dimensional guides given above for the spinneret for making triskelion section filaments will apply ordinarily for the other spinnerets.

Deviation coefficient (D.C.) is defined as the quotient of the perimeter of a given filament cross section or orifice and the perimeter of a circle having the same cross-sectional area of the given filament or orifice. Stated mathematically, $$\text{D.C.} = \frac{P}{2\sqrt{\pi A}} = \frac{P}{3.54\sqrt{A}}$$

wherein P is the actual perimeter of a given filament or orifice cross section and A is the actual area of such section, P and A being measured in consistent units. Hence, D.C. is a measure of the deviation of the cross section of a filament from a circular filament of equal denier or of the deviation of the cross section of an orifice from a circular hole of equal area.

The invention will be more fully understood by reference to the following description and the accompanying drawing, in which:

FIGURE 12c is an enlarged representation of a filament cross section having its lobes inclined in a direction opposite from that in FIGURE 12a;

FIGURE 13b is an enlarged representation of a filament cross section having its lobes inclined in a direction opposite from that in FIGURE 13a;

Figure 1:
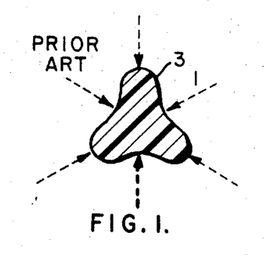
FIGURE 1 is an enlarged representation of a prior art filament having three degrees of planar symmetry.

In FIGURE 1 a cross section of a filament 1 known heretofore is shown. The branches of this cross section, as can be noted, are equi-spaced and present a symmetrical configuration. In this case there are three degrees of planar symmetry; and the filament has threefold axial symmetry. It has been found that the resiliency of this type of filament is not entirely satisfactory. Although this filament has good cover and light reflective properties, it would be desired to increase the resistance to matting of carpets made from filaments of this type of filament. Furthermore, it has been found difficult to melt spin these prior art filaments since the filaments in conventional air quenching chimneys exhibit undesirable instabilities. As above indicated, dye non-uniformities in fabric made therefrom can be related to the unstable behavior of the filaments during quenching.

Figure 2:
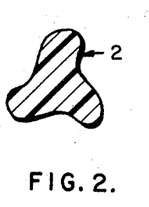
FIGURES 2 and 3 are enlarged representatives of cross sections of two types of filaments of the invention.

In FIGURE 2 a cross section of a filament 2 having a triskelion cross section is shown. The branches of this cross section, as can be noted, are equi-spaced. The end portions of the branches incline together in one direction. For convenience, by definition, this type of triskelion cross section can be called right-hand triskelion cross section in view of the clockwise inclination of the branches. There is no planar symmetry; and the filament has threefold axial symmetry. It has been found that the resiliency of this type of filament is superior to the prior art filament shown in FIGURE 1 and to filaments with circular cross section. Carpets made from the triskelion section filaments accordingly show increased resistance to matting. Furthermore, melt spinning of the triskelion section filaments is more facile in that they are more stable during their passage through the air quenching chimney. Fabric woven from such filaments can be dyed more uniformly than fabrics woven from the prior art melt-spun filaments having planar symmetry.

The reason that the triskelion section filament has greater resiliency is not entirely known. However, the following may be the explanation. In most fabrics, and especially in cut pile fabrics, the individual filaments have some freedom of movement relative to another even though the latitude of such movement is small. The filaments normally are sized or lubricated with a finish. This means, practically, that the filaments will usually sustain relatively small tangential forces compared with normal forces acting at the external surface of the filament. Thus, when a filament bears against its neighbor, the principal opposing force components are directed normal to the filament surface. With round filaments the normal at any point coincides with the radius so that the normal force is directed through the center at right angles to the axis of the filament. Hence, the round filament tends to simply bend in the direction of the force without necessarily sustaining twist or torsion; deflection to the extent of buckling under this condition leads to retarded as well as to reduced elastic recovery when the stress is removed.

The symmetrical Y-section, on the other hand, has only six normals that pass through the centroid of the section. These are indicated by the broken arrows in FIGURE 1. Whenever the force is directed along one of these normals the filament bends in this same direction similar to a circular filament. But, the area moment of inertia of the Y-section filament exceeds that of a round filament for equivalent denier so that the Y-section filament is stiffer and will sustain a greater force (moment) for equal deflections. Moreover, when a normal force is applied at any other point, such as point 3, the filament no longer is deflected in the same direction as the initial force. Instead, the filament tends to twist as well as to bend. As indicated, with the known Y-section filaments there are six normals that pass through the centroid or through the center of twist. In the present filaments the branches are unsymmetrical about these normals; thus, an infinitesimal deflection will displace the direction of the force from the centroid insuring eccentric loading which necessarily develops torsion in the present type of filaments. The resulting situation is that the filaments of the present invention are not only stiffer than the known symmetrical Y-section filaments of equivalent denier but are also more resilient.

In comparing FIGURES 1 and 2 it will be observed that the triskelion filament section has three substantially equivalent unsymmetrical lobes or branches equally spaced about a center, but there is no axis of symmetry in the plane of this cross section. Stated differently, the triskelion section filament has threefold axial symmetry but has neither planar symmetry nor radial symmetry. In contrast, the prior art filament has three planes of symmetry as well as threefold axial symmetry.

It is possible to distinguish a right-hand form of triskelion cross section and a left-hand form of triskelion cross section. The form shown in FIGURE 2 is designated as the right-hand form; a filament of this form moving out of the plane of the sheet of drawing (or spinneret) into a transverse airstream tends to rotate in the same direction as a right-hand screw. Conversely, the left-hand form of triskelion filament 4 in FIGURE 3 tends to rotate in the opposite direction. Or, simply considering the plane sections as shown, the right-hand section will rotate counterclockwise; and the left-hand will rotate clockwise. The existance of this tendency to rotate is quite important with respect to the improved resiliency of the filament and its stability during melt spinning thereof.

Figure 3:
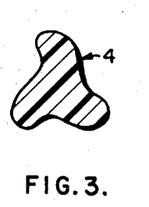

It should be noted that when a triskelion filament is turned around end-for-end its orientation is reversed; i.e., a right-hand triskelion is identical to a left-hand triskelion if it is viewed from its other end. Consequently, any time the ends of a triskelion yarn are interchanged an odd number of times, the hand of the triskelion is reversed; but when the ends are interchanged an even number of times, the hand of the triskelion is unchanged. Therefore, to clearly indicate the hand of the triskelion to the user of the yarn so that advantage may be taken of the differing properties of the two species of yarn, an arbitrary convention is necessary; if the section of the free end of a filament or yarn being removed from a spinneret, bobbin, or other yarn holder presents to the viewer the configuration illustrated in FIGURE 2, the yarn is termed right-hand triskelion yarn; if the configuration shown in FIGURE 3 is seen, the yarn is termed left-hand triskelion yarn. Importance is attached to observing this convention since producer's yarn is frequently backwound, uptwisted, or otherwise treated before it is converted into the final fabric.

Figure 4:
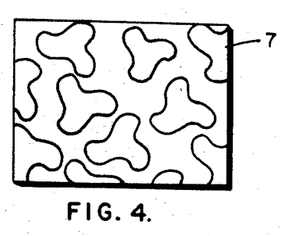
FIGURE 4 is an enlarged representation of a cross section of a yarn composed of filaments of the present invention.

FIGURE 4 illustrates in cross section a photomicrograph 7 of a bundle of triskelion section filaments of the present invention. All filaments are right-handed; that is, the lobes of all the filaments incline together in a clockwise direction.

Figure 5:
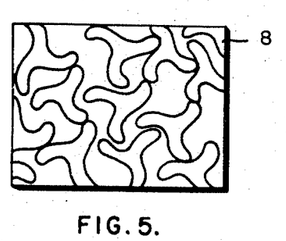
FIGURE 5 is an enlarged representation of another group of filaments in cross section of the type of the invention.

FIGURE 5 illustrates in cross section a photomicrograph 8 of a bundle of triskelion filaments of the present invention. In contradistinction to the filaments of FIGURE 4, the branches of these filaments are slender and well-defined and have the left-handed orientation. For equivalent denier the thin triskelion filaments exhibit more cover than thicker triskelion filaments.

Figure 6:
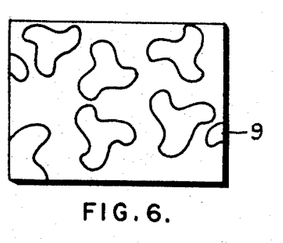
FIGURE 6 is an enlarged representation of a group of filaments, depicting a mixture of the filaments of the types of FIGURES 2 and 3.

FIGURE 6 illustrates in cross section a photomicrograph 9 of a bundle of triskelion filaments of the present invention. As can be noted, the bundle includes both left-hand triskelion section filaments and right-hand triskelion section filaments. The existence of two species and the lack of planar symmetry of triskelion section filaments of the present invention make it possible to vary the natural bulk of multi-filament yarns composed of such types of filaments. A yarn composed of one species of filaments, all right-hand, for example, will have a different natural bulk when it is given Z-twist as compared with S-twist. Furthermore, there is an infinite number of possible packing arrangements which differ slightly from one another for single-species triskelion section filaments composing a yarn. Similarly, a yarn composed of mixed-species filaments, right-hand and left-hand, has an infinite number of possible packing arrangements; but, none of these possible arrangements can be identical with an arrangement for single-species yarns. Therefore, mixed-species yarns necessarily have a different natural bulk than single-species yarns.

Triskelion filaments are particularly suited to artificial bulking by common texturing techniques. One such technique producing bulky continuous filament yarn currently receiving wide acceptance in the textile trade, especially in the manufacturing of rug covering material and other pile fabrics, may be referred to as the gear-texturing method. This texturing procedure includes passing filament yarn of a thermoplastic polymer which is not fully molecularly oriented through a stretching zone wherein the filaments are heated to an elevated temperature and stretched. Immediately after leaving the stretching zone, the filaments are deformed into a corrugated shape while being quickly cooled by passing between the engagement of cool meshing gears. The yarn so-processed has marked latent crimp which can be developed by a subsequent relaxation process. The gear-texturing method imposes an unsymmetrical strain upon the triskelion section filaments of the present invention; when the restraint is removed by relaxation of the filaments, each crimp therein will tend to buckle in a different plane forming three-dimensional sinuous crimps with increased bulkiness and cover. Such resulting yarns are especially suitable for sweaters and woven goods, as well as for floor covering and upholstery fabrics.

Having a triskelion section enables the filaments of the present invention to develop a cumulative torque in an airstream. This makes the filaments particularly amenable to texturing by the turbulent fluid method. Displacement of the filaments in a strong current of fluid results from employing such method. This filamentary displacement is accomplished by passing a continuous filament yarn into a confined zone through which a stream of high velocity gas is passed and abruptly removing the yarn from the stream of fluid just as the yarn is withdrawn from the zone. The resulting yarn may or may not have loops projecting therefrom along the length thereof. The presence or absence of these loops depend on the processing conditions employed. Mixed-species of triskelion section filaments when textured by the turbulent fluid method develop considerably greater bulk and cover than a similarly treated planarly symmetrical Y-section yarn.

Likewise, because of the dependence of packing upon twist, as mentioned previously, triskelion filaments are well suited to texturing by the widely-known heat-set twist or false-twist methods. Again, mixed-species of triskelion section filaments develop a novel form of bulk when textured by twist-set techniques.

To have the utility ascribed to them in the foregoing disclosure, triskelion section filaments must have a deviation coefficient within the range of 1.10–1.85. In general, natural bulk, cover, and stiffness increase with an increasing value of the deviation coefficient. Above the indicated upper limits, however, the lobes or branches of the filaments become so thin and flexible that triskelion section filaments tend to lose their distinct advantages. Similarly, below the lower limits of the deviation coefficient the triskelion section filament closely resembles an ordinary Y-section filament functionally and thus no longer possesses a distinctive superiority.

Figure 7:
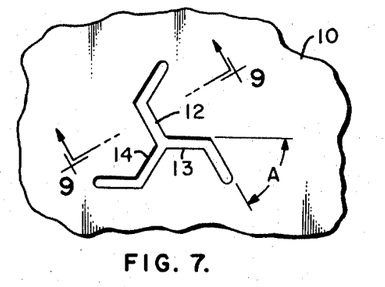
FIGURE 7 is an enlarged plan view of a fragment of a spinneret plate having an orifice adapted to produce a textile filament having a triskelion cross section.

FIGURE 7 depicts a fragment of a spinneret plate 10 for melt spinning triskelion section filaments of the type shown in FIGURE 2. Three connected elongated branches 12–14 extend radially from their point of connection and form a trifurcated slot. These branches are preferably equally spaced; but it is not essential that the branches be exactly 120° apart, since unequal spacing thereof may be desired under some circumstances. As illustrated, the branches are of equal length; but novel filaments can be produced by employing trifurcated orifices having branches of unequal length. It is necessary that the branches in their distal end portions be angled together in one direction so that the filaments produced therefrom will present no plane of symmetry. The departure of the distal end from a radial line is indicated by angle A. This offset angle should be about 20 to 80°. The point where the distal end departs from the radial end is shown to be about midway the length thereof. However, from their point of connection the branches can extend along radial lines for about 30 to 65 percent of the total length before departing therefrom. The branches may or may not be of the same width along their lengths. However, better stability during melt spinning is realized when the width of the branches is reduced outwardly beyond the point of bend. The same result is accomplished by tapering the distal ends of the branches.

Figures 7A, 8, 8A:
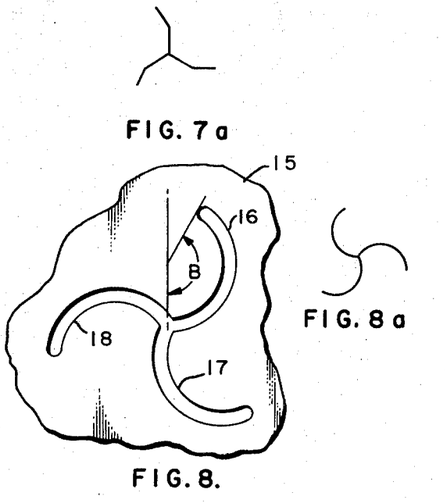
FIGURE 7a is a schematic representation of a spinneret orifice configuration adapted for producing a textile filament having a triskelion cross section exhibiting branches inclined in the direction opposite to those of FIGURE 7.
FIGURE 8 is an enlarged plan view of a fragment of a spinneret plate having a different orifice configuration, the branches of which are arcuate.
FIGURE 8a is a schematic representation of a spinneret orifice adapted for producing a textile filament having a triskelion cross section exhibiting branches arcuately inclined in the direction opposite to those of FIGURE 8.

In FIGURE 8 a fragment of a spinneret plate 15 for melt spinning triskelion section filaments is shown. Three circularly curved branches 16–18 extend from their point of connection to form a trifurcated slot. It is necessary that the arcuate branches be curved together in one direction. As shown, the three curved branches are equi-spaced about their common point of intersection. Branches bounded by circular arcs which subtend a central angle B within the range 130° to 200° are preferred because of the ease of fabrication; but, other types of curved arcs, such as parabolic, elliptical, cycloidal, etc., are also suitable. At the present time curved slots are relatively more difficult to form in spinneret materials so that the straight slot type shown in FIGURE 7 is usually more practicable.

Figure 9:
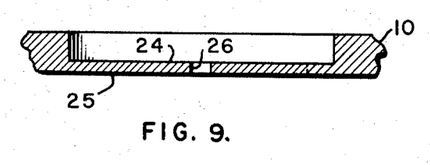
FIGURE 9 is a fragmentary sectional view of part of the spinneret plate taken along line 9—9 of FIGURE 7 and looking in the direction of the indicating arrow.

In FIGURE 9 it will be seen that the spinneret 10 shown in FIGURE 7 has a melt face 24 (or bottom of counterbore) and an extrusion face 25. Bounding wall 26 defines a trifurcated passageway for molten polymer. Normally, spinning is accomplished with the extrusion face down and horizontally disposed.

Figure 10:
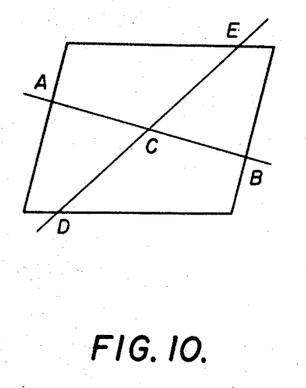
FIGURE 10 is a sketch of a parallelogram.

A parallelogram has radial symmetry as indicated in FIGURE 10 in which C is the center of the parallelogram. A straight line AB drawn through center C intersects the boundary in the points A and B, and the length of line segment CA is equal to that of segment CB. Likewise, the straight line DCE intersects the boundary in points D and E both of which are equidistant from C.

Figure 11:
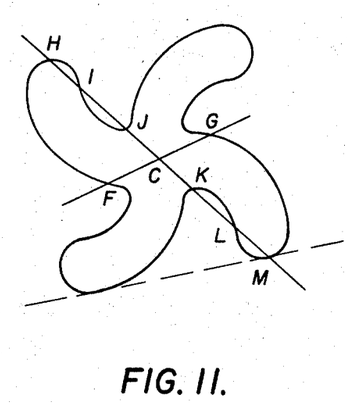
FIGURE 11 is a cross section of a filament having radial symmetry.

A more complex figure having a radial symmetry is illustrated in FIGURE 11. This figure is symmetrically similar to a filament cross section disclosed previously. The figure may be regarded as a filament section having four planar-unsymmetrical lobes equispaced about a center. It does have radial symmetry, however. The line FG, for example, intersects the boundary in points F and G both of which are equidistant from center C. Line HM intersects the boundary in six points which are equidistant from the center C by pairs; viz., J and K, I and L, and H and M. Any other straight line through the center will likewise intersect the boundary at points equidistant from the center.

Figure 12A:
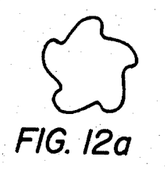
FIGURE 12a is an enlarged representation of a typical five-lobed yarn cross section of the present invention.
Figure 12B:
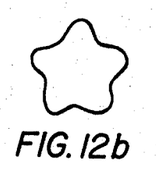
FIGURE 12b is an enlarged representation of a prior art filament in sections having planar and axial symmetry but no radial symmetry.
Figure 12C:
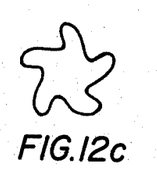

FIGURE 12 illustrates typical five-lobed yarn cross sections. FIGURE 12a is a section of a filament of the invention having the right-hand orientation; this section has five-fold axial symmetry but has no planes of symmetry nor does it have radial symmetry. FIGURE 12b is a five-lobed filament section of the prior art which has five-fold axial symmetry and five planes of symmetry but is not radially symmetrical. FIGURE 12c shows a five-lobed filament section of the invention with the left-hand orientation.

Figure 13A:
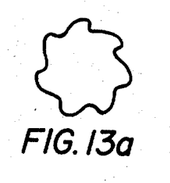
FIGURE 13a is an enlarged representation of a typical 7-lobed filament section of the present invention.
Figure 13B:
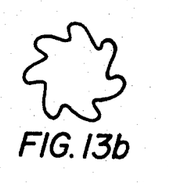

FIGURE 13 shows two typical seven-lobed filament sections according to the invention; FIGURE 13a is of right-hand and FIGURE 13b is of left-hand orientation. These section have seven-fold axial symmetry.

Figure 14A:
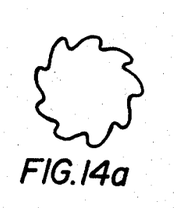
FIGURE 14a is an enlarged representation of a typical nine-lobed filament section of the present invention.
Figure 14B:
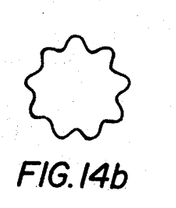
FIGURE 14b is an enlarged representation in section of a prior art filament having nine lobes and exhibiting planar and axial symmetry.

FIGURE 14a is a typical nine-lobed section according to the invention and has nine-fold axial symmetry. FIGURE 14b is the comparable nine-lobed filament of the prior art which has nine-fold axial symmetry and nine planes of symmetry. Neither cross section is radially symmetrical.

Figure 15:
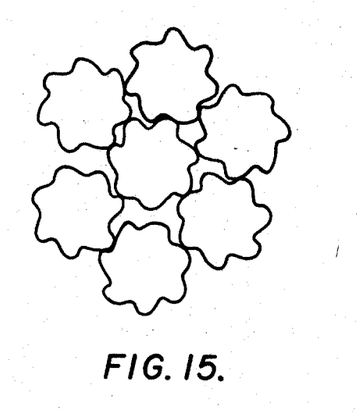
FIGURE 15 shows a section through a seven-filament yarn containing both left-hand and right-hand seven-lobed filaments of the invention.

FIGURE 15 shows a section through a seven-filament yarn containing both left-hand and right-hand seven-lobed filaments of the invention.

It should be noted here that the lack of radial symmetry is a further distinguishing geometrical feature between the filaments of the invention and those of the prior art. As indicated previously, the four-lobed section shown in FIGURE 11 has axial symmetry and radial symmetry. Because of its radial symmetry, the bending behavior of a filament with the section shown in FIGURE 11 differs significantly from that of either the triskelion or the skewed five-lobed filament of the invention; this follows from the fact that there exists relatively stable planes in which bending deflection may occur. Such a stable plane would be a plane through the centroid parallel to the plane indicated by the dashed line in FIGURE 11 (or a plane of 90° to this line). Under a bending load the filament would tend to twist until the deflection is about this plane; comparatively little net torque would develop thereafter because the radically symmetric elements tend to balance until a very large deflection disturbs this balance. In this respect, the skewed four-lobed filament resembles quite closely the bending behavior of the symmetrical trilobe or the symmetrical five-lobed section of FIGURE 12b, as previously mentioned specifically in reference to the triskelion. On the other hand, all the skewed section filaments of the invention have no relatively stable planes of bending and therefore continue to twist as bending proceeds to the point of bucking.

In addition to the favorable bending or flexing characteristics that provide greater resilience in knit and woven fabrics and in pile, filaments of the invention have greater aerodynamic stability in a transverse air stream as previously stated for the triskelion. Yarns of the invention also pass over thread guides and solid surfaces more readily than the comparable symmetrical lobed filaments of the prior art. Filaments of the invention also tend to be duller or more opaque than comparable lobed filaments having planar symmetry because a greater fraction of the light entering the filament is scattered by internal reflections without emerging in the direction of incidence. Mixed, right and left-hand skewed lobed filaments are preferable in multifilament yarns unless the subtle differences between the two forms of filaments are to be utilized purposely in the fabric.

The five-, seven-, and nine-lobed skewed filaments are better suited to sheer fabrics than the triskelion because of the lower covering power and slightly silkier or less harsh handle; these filament types may of course be used in carpet and cut pile fabrics too but are more advantageously applicable to tricot, taffetas and other flat woven goods.

The skewed multilobal filaments with five, seven or nine lobes are especially well adapted for use as unflagged bristles in such applications as toothbrushes and hair brushes, or other brushes that are used with a "swirling" motion. The characteristic bending behavior of the filaments of the invention makes them particularly useful in such brushes or other stiff, cut pile structures.

As noted with respect to the triskelion alone, filaments of the invention have maximum utility only when the various shapes are distinctly formed within rather broad limits defined by the deviation coefficient. If the nine-lobed filaments illustrated in FIGURE 14, for example, were appreciably more degenerate than indicated, both would so nearly approach circularity that no significant practicable difference would be noted in fabrics made of the filaments. Similarly, if the filament section becomes much more distinctly formed than the seven-lobed filament shown in FIGURE 13b, the lobes become too thin and flexible so that they tend to collapse under very small loads or to split off entirely.

Orifices of spinnerets suitable for the production of filaments of the invention have the same elements of symmetry as the filaments, namely, axial symmetry but no planar or radial symmetry.

Figures 16A, 17:
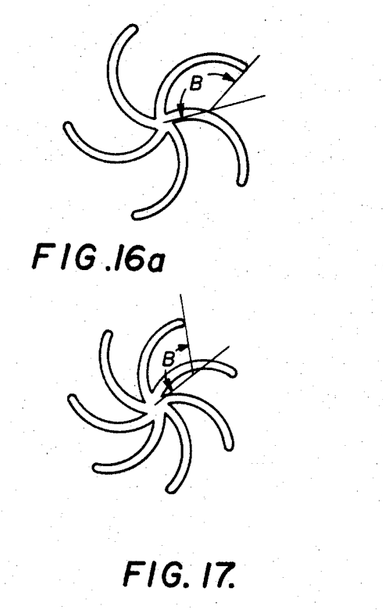
FIGURE 16a is a right-hand curved-slot capillary for skewed five-lobed filaments.
FIGURE 17 illustrates a right-hand curved-slot orifice for producing a seven-lobed filament, the straight-slot form, not illustrated, is also suitable.
Figure 16B:
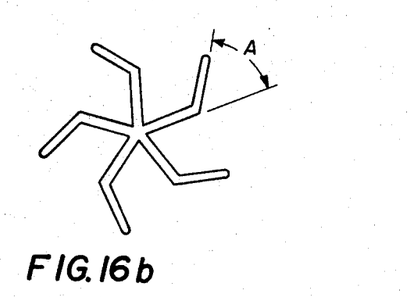
FIGURE 16b is a left-hand straight-slot capillary for five-lobed filaments.
Figure 18:
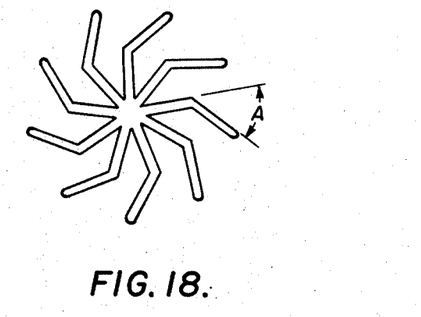
FIGURE 18 illustrates a right-hand straight-slot orifice suitable for nine-lobed skewed filaments; similarly, curved-slot orifices, not illustrated, are suitable.

Spinneret orifices for triskelion filaments are shown in FIGURES 7–9 and other orifices are shown in FIGURES 16–18. Right-hand and left-hand type capillary sections are possible; the arc length or central angle of the curved form of slot is designated B, and the offset angle of the straight form of slot is designated A. The central angle, offset angle and deviation coefficient (D.C.) will vary according to the number of lobes. The preferred ranges of structural parameters of the spinneret orifices are summarized in Table 2 below:

TABLE 2

| Filament Section | Central Angle, degrees | Offset Angle, degrees | D.C. |
| --- | --- | --- | --- |
| 3-lobed (triskelion) | 130–200 | 20–80 | 2.2–4.2 |
| 5-lobed | 90–165 | 20–75 | 2.5–4.6 |
| 7-lobed | 90–130 | 20–60 | 2.7–5.5 |
| 9-lobed | 90–120 | 20–45 | 3.3–6.4 |

A composite curved slot may be used, such as partly straight and partly circular. Or, preferably a continuous curve with varying curvature, such as an elliptical arc, may be used. These more complicated curved slots are generally more difficult to produce than the circular or the straight slot, however, and are seldom justifiable in practice.

The staight-slot form of capillary, such as that shown in FIGURE 18, has an advantage over the curved slot form for seven-lobed and nine-lobed orifices that have small angular spacing (51 3/7° and 40°, respectively). Unlike the curved slot, the straight slot diverges from the adjacent slot at a constant angle until the abrupt change at the offset angle A. Unless offset angle A is unduly large, bringing the bent portion too close to the adjacent leg, instability due to coalescence of adjacent lobes is normally avoided. The bent "kneed" tip of the slots are preferably made slightly narrower than the central or "thigh" portion of the slot, as previously indicated for the triskelion orifice.

The spinning variable such as melt viscosity, jet velocity, spinning speed, rate of solidification, etc., are properly co-ordinated so that the novel filaments of the present invention are produced. The most advantageous spinning conditions will ordinarily be determined in an empirical manner, since many factors of subsequent treatment enter into the choice of particular conditions.

The filaments of the present invention can be used to prepare either staple fibers or continuous filament yarn from a wide variety of synthetic thermoplastic fiber-forming polymers. As examples of these, the following may be mentioned: polyethylene; polypropylene; polyurethanes; polycarbonates; copolymers of vinyl acetate and vinyl chloride; the copolymers of vinylidene chloride and a minor proportion of mono-olefinic compound copolymerized therewith, such as vinyl chloride; homopolymers of acrylonitrile, copolymers of acrylonitrile and a minor portion of at least one mono-olefinic compound copolymerized therewith and polymer blends containing combined acrylonitrile ina major proportion; copolymers of vinyl chloride and acrylonitrile; linear polyesters of aromatic dicarboxylic acids and dihydric compounds, such as polyethylene terephthalate, modifications thereof and the polyester derived from terephthalic acid and bis-1,4-(hydroxymethyl) cyclohexane; linear poly-carbonamides such as polyhexamethylene adipamide, polyhexamethylene sebacamide, polymeric monoaminomonocarboxylic acids, such as polymeric 6-amino caproic acid; and other fiber-forming thermoplastic polymers. Mixtures of such polymer can be used.

11

The denier of the filaments can be varied. Filament deniers of 0.25 to 25 and greater are suitable.

Some illustrative examples will now be given. However, it is understood that the invention is not limited thereto.

EXAMPLE I

This example illustrates that a practical difference exists between the performance of left-hand and right-hand forms of triskelion filaments.

A six-hole spinneret was made in which three capillaries were of the left-hand type shown in FIGURE 8 and three capillaries were of the right-hand form shown in FIGURE 8a. The width of the curved legs is 0.003 inch; the radius of the centerline of the circular arc curved leg is 0.0135 inch; and the central angle B is 150°. The deviation coefficient (D.C.) of each capillary section is 3.4; and the length of each capillary is 0.015 inch.

This 6-hole spinneret was installed in a standard melt-spinning machine for Nylon-66. Molten Nylon-66 containing 0.3% $TiO_2$ delusterant and having a relative viscosity of 54.1 was extruded at 293° C. through the spinneret to form three right-hand triskelion and three left-hand triskelion monofilaments. Average jet velocity of the polymer through each capillary was about 58 ft./min. The molten filaments were cooled and solidified by blowing air at 22° C. across the filaments at a liner air rate of 61 ft./min. Each filament was wound up separately on a common bobbin at a speed of 517 yds./min.

As removed from the spin bobbin each filament had now assumed the reverse hand compared with the hand as spun from the spinneret; i.e., right-hand triskelion was now left-hand, and vice versa. The spun filaments were then drawtwisted on a standard drawtwister at a machine draw ratio of 4.23, and were wound up with a ring-traveller system to impart approximately 0.27 turn/inch of Z twist to each filament. The interchange of ends in the drawtwisting operation again reversed the hand of each triskelion so that as removed from the drawtwisted package, each triskelion resumed the same orientation it had as it extruded from the spinneret. The resultant monofilaments had an average denier of 10.3.

Spinning and drawtwisting conditions were then changed and with the same 6-hole spinneret other triskelion monofilaments were produced:

Polymer relative viscosity _____________________ 36.4
Spinning temperature _______________________° C__ 293
Average jet velocity ________________ft./min__ 73
Cooling air velocity ________________ft./min__ 61
Windup speed ________________________yds./min__ 461
Draw ratio ____________________________________ 4.41
Twist ______________________________________Z__ 0.27
Filament denier _______________________________ 15.3

During the spinning operation the triskelion filaments exhibited very uniform false-twisting in the quenching chimney; and the release of this twist was observed to be less erratic than that usually observed with ordinary trilobal filaments. When all six filaments were converged together at a single guide-slot, the two types of filaments tended to segregate; i.e., the three left-hand triskelion filaments would twist together in a single three-filament bundle at the guide, while the right-hand triskelion filaments would twist into another separate three-filament bundle. This indicates that the two types of spinning filaments consistently tend to develop opposite twists; i.e., right-hand triskelion filaments have S twist compared with Z twist of the left-hand triskelion. Ordinary trilobal filaments tend to show erratic random twisting together in the spinning chimney, depending upon the direction of twist which happens to prevail at the moment.

Cross sections were cut along the length of several 10-denier and 15-denier filaments, and photomicrographs

12 were made. Cross sectional shape was quite uniform. The deviation coefficient of the cross sections was determined by measuring cross sectional areas with an Ott polar planimeter and by measuring perimeters with an opisometer (map measure).

Samples of 10-denier and 15-denier triskelion Nylon-66 filaments were knitted into the leg and foot portion of ladies' seamless hoisery on a 400-needle, plain stitch, Scott and Williams Model KN knitter. Similar comparison hose were made with standard commercial 10-denier circular section monofilament yarn; 15-denier circular section yarn, spun from the same type polymer as the triskelion sample, and a commercial sample of 15-denier symmetrical trilobal Nylon-66 yarn were also knitted for comparison with test hose. All hosiery samples were boarded, dyed, and finished according to standard procedures.

The finished hose were tested for resistance to "picks and pulls" by use of a tester designed by Hanes Hosiery Mills and constructed by Superior Machine Works. The tester consists of a small closed cylindrical drum which is rotated about its axis. A number of sharp pins project from the inner surface of the drum. Hose to be tested is first stretched over a form and is examined for picks or snags which are then marked for later identification. The hose is placed in the tester drum which is then rotated at constant speed for a set period of time. Next the hose is removed and examined for picks or pulls which developed during tumbling; then the hose is turned inside out, tumbled in the tester drum, and re-examined. Thus, the total number of picks and pulls is determined. Ten hose of each test item and of each comparison control item were submitted to the picks-and-pulls test, and the average number of picks-and-pulls per hose was calculated, yielding the results listed in Table 3.

TABLE 3

| Yarn type | Denier | D.C. | Avg. number of picks and pulls |
|---|---|---|---|
| Right-hand triskelion | 10.2 | 1.28 | 8.3 |
| Left-hand triskelion | 10.4 | 1.28 | 11.3 |
| Standard circular section | 10 | 1.0 | 18.3 |
| Right-hand triskelion | 15.4 | 1.21 | 2.1 |
| Trilobal (symmetrical) | 15.3 | 1.06 | 3.5 |
| Left-hand triskelion | 14.9 | 1.22 | 4.4 |
| Circular section | 15.5 | 1.0 | 6.6 |

In the particular style of hose tested, the non-circular section yarns had superior snag-resistance compared with normal circular section yarns. In both 10-denier and 15-denier, right-hand triskelion filaments were superior to left-hand type, indicating that a difference does exist in the performance of two types. In 15-denier the right-hand triskelion also had better resistance to snagging than the commercially available symmetrical trilobal yarn.

EXAMPLE II

To test the operability of the triskelion type spinneret orifice in spinning multifilament yarns, a 34-hole spinneret was made of stainless steel. Dimensions of the capillaries were identical with those of the 6-hole spinneret described in Example I. The holes were arranged in two groups: 17 capillaries were of right-hand triskelion orientation and 17 capillaries were of the left-hand orientation.

The 34-hole spinneret was installed in a standard melt-spinning machine. Nylon-66 containing 0.1% $TiO_2$ delusterant was melt extruded through the spinneret under the following conditions to yield two threadlines, each containing 17 filaments:

Polymer relative viscosity _____________________ 45.1
Spinning temperature _______________________° C__ 292
Average jet velocity ________________ft./min__ 13.4
Cooling air velocity ________________ft./min__ 66
Windup speed ________________________yds./min__ 1500

Again in spinning, these filaments showed a very uniform accumulation of and release of false-twist as the filaments were drawn away from the spinneret and over guide surfaces.

The spun yarn was drawtwisted at machine draw ratio 2.54 and was given 0.41 turn/in. of Z-twist to yield a 40-denier, 17 filament yarn. Since the ends of the yarn were interchanged twice, the orientation of the yarns as removed from the drawn package was the same as its initial orientation, i.e., the left-hand and right-hand triskelion sections yarns had the same orientation as removed from the drawtwisted bobbin as they had when leaving the spinneret.

The tenacity and elongation of the 40–17 triskelion section yarns were measured on a Suter Tester and were found to be normal; viz, elongation was 23.7% and tenacity was 5.0 gm./denier. The deviation coefficient was determined from photomicrographs of filament cross sections; the average D.C. was 1.19.

Samples of triskelion yarns were knitted into circular tubes with panels adjacent to similar panels composed of standard semi-dull 40 denier circular filament yarn. Even though triskelion yarn contained only one-third as much $TiO_2$ as standard yarn, the triskelion fabric had at least 20% greater opacity or covering power than standard. The triskelion yarn had an attractive bright but soft luster compared with standard yarn. The principal difference in appearance between the left-hand and right-hand triskelion yarn fabrics was in the luster; the angle of viewing for maximum luster for the left-hand triskelion fabric differed considerably from that of the right-hand triskelion fabric. Stylistic effects in fabrics can be achieved without sacrifice or covering power by means of this luster property by combining separate ends of left-hand and right-hand triskelion yarns in the same fabric.

EXAMPLE III

Another stainless steel spinneret was made with 68 triskelion capillaries of the form shown in FIGURE 7. The straight radial slots were 0.0034 inch wide by 0.020 inch long, and the continuing straight offset slots were 0.0026 inch wide by 0.018 inch long, giving a total branch length of 0.038 inch. Offset angle A was 60°, and capillary length was 0.031 inch. Deviation coefficient for each capillary was 3.5. All 68 capillaries had the left-hand triskelion orientation indicated in FIGURE 7a.

The experimental 68-hole spinneret was installed in a standard melt-spinning machine and Nylon-66 polymer containing 0.3% $TiO_2$ delusterant was extruded to produce several different samples of yarn under these basic spinning conditions:

Spinning temperature ________________ ° C__ 280–290
Average jet velocity _________________ ft./min__ 194
Cooling air velocity _________________ ft./min__ 65
Windup speed ______________________ yds./min__ 400

The 68 filaments from the spinneret were wound up as a single threadline with a total nominal denier of 4400 (65 d.p.f.). Polymer vicosity and spinning temperature were varied as necessary to produce samples of filaments with differing degrees of cross sectional definition (measured by D.C.). A comparable 68-hole spinneret which had standard straight-leg Y capillaries was installed in an adjacent spinning position supplied with the same type of polymer. The three equispaced straight branches of the Y capillaries were 0.003″ wide by 0.040″ long with a circular expansion 0.006″ in diameter at the end of each leg. Thus, triskelion section filament and normal trilobal or Y-section filament yarns were produced under similar conditions.

In the spinning operation the triskelion filaments exhibited unusually steady movement in the cooling-air stream. False-twist buildup was quite pronounced but was released at guide surfaces with very little evidence of jerkiness. Observation of the spinning filaments with a stroboscope ("Strobatac") showed that the false-twist development was distinctly different in character from that observed with normal Y-section yarns spun under similar conditions. It appeared that the triskelion filaments did indeed develop a predominantly unidirectional false-twist rather than the usual fluctuating random twist.

The spun yarn samples were texturized by the above described hot-stretch, gear-crimp method. In this operation the spun yarn was stretched at a machine draw ratio of 4.02, and was given 0.25 turn/in. of twist in the S direction; a few samples were also made with 0.25 turn/in. of Z-twist. The total denier of the resultant draw-texturized yarns was 1230 (18 d.p.f.).

Two ends of each 1230–68–0.25S yarn sample were next plied together with Z-twist to yield a single end of 2460–136–0.5Z yarn, or more explicitly, 2460–136, 0.25S x 0.5Z yarn, the twist in the single ends and in the doubled ends being indicated separately.

Finally, the texturized 2460–136–0.5Z yarns were backwound on to conical bobbins for subsequent use. Since there was a total of four interchanges (an even number) of the ends of the yarns in the course of production, the final orientation of the triskelion filaments as removed from the cone was the same as the filaments had when extruding from the spinneret; that is, as removed from the cone the triskelion filaments had the left-hand orientation.

The 2460–136 yarn test samples were then divided into groups of three, together with a "control" sample of commercially available 2460–136 texturized carpet Nylon-66 yarn. The control sample was composed of gear-crimped filaments having symmetrical cross sections. Forty-two ends of each of the four items in a group were drawn through the needles of a 168-needle, 5/32 inch gage, loop-pile tufting machine. Twenty ounce per square yard tufted carpet was made up in two styles: a plain straight loop-pile carpet, and a high-low loop-pile patterned carpet. Each sample item appeared as a band 6″ wide in the finished carpets. "Picks" formed on the backside of the jute backing were counted as an indication of relative tufting performance of the various items. The carpets were backed with latex, dyed, and finished by standard commercial procedures. Undyed samples of the greige carpet were also retained.

The carpet samples, both greige and dyed, were floor-tested by placing pieces of the various samples in the aisle of an industrial cafeteria where a count was kept of the pedestrians walking across the specimens. After exposure to 64,000 traffics, the samples were taken up and were cleaned by a single pass with a standard domestic vacuum cleaner. Each group was then examined visually by four persons, and the best item in each group was selected on the basis of apparent soilage, cover, tuft definition, resilience, and general appearance. Only those items outstandingly superior to the common control and to other test items were chosen. Characterization of the test items and the results are shown in Table 4.

Note that in each of the three groups which include triskelion yarns, the best tufting performance occurred with a triskelion yarn (fewest back picks). And, without exception, triskelion yarns produced the carpet with the best appearance and performance in the floor test. The most notable differences were the superior resistance of triskelion yarns to crushing or matting of the tufts under traffic, and less apparent soilage, possibly due to optical illusion or to the peculiar interstices between the curved-leg filaments which allow dirt to spread out. None of the trilobal filament yarns in Group 1 were sufficiently better than control to merit comment.

Observe too that twist combination with the triskelion yarns had a distinct effect upon tufting performance and carpet appearance, as illustrated by items H and I which differed only in the direction of twist in the ply. Z-twist gave better performance and best carpet in the high-low pattern; but S-twist gave the best straight loop carpet.

TABLE 4

| Group | Item | Fil. Section | Avg. D.C. | Polymer R.V. | No. Back Picks On— Patterned | No. Back Picks On— Straight Loop | Floor Test Conclusions |
|---|---|---|---|---|---|---|---|
| 1 | A | Trilobe Y | 1.46 | 48.1 | 2 | 3 | No item in group better than control. |
|  | B | do | 1.27 | 48.4 | 3 | 4 |  |
|  | C | do | 1.70 | 48.2 | 3 | 5 |  |
|  | Control | do | 1.45 | 48 | 6 | 8 |  |
| 2 | D | L. H. Triskelion | 1.54 | 47.2 | 3 | 0 | Item E best in group (patterned). |
|  | E | do | 1.18 | 48.2 | 4 | 3 |  |
|  | F | do | 1.39 | 49.3 | 6 | 0 |  |
|  | Control | Trilobe Y | 1.45 | 48 | 4 | 3 |  |
| 3 | H | L. H. Triskelion | 1.39 | 49.3 | 0 | 4 | H (0.25Z×0.5Z) best item in patterned. I (0.25Z×0.5S) best item in straight loop. |
|  | I | do | 1.39 | 49.3 | 3 | 5 |  |
|  | J | do | 1.55 | 49.2 | 6 | 8 |  |
|  | Control | Trilobe Y | 1.45 | 48 | 4 | 7 |  |
| 4 | K | L. H. Triskelion | 1.44 | 54.3 | 0 | 2 | Item L best in group (straight loop). |
|  | L | do | 1.28 | 53.9 | 3 | 0 |  |
|  | M | Trilobe Y | 1.55 | 56.2 | 13 | 22 |  |
|  | Control | do | 1.45 | 48 | 4 | 4 |  |

Note.—Except as indicated, twist of all items 0.25S×0.5Z. Trilobe Y has reference to yarn having three degrees of planar symmetry. L. H. means left-hand.

EXAMPLE IV

A six-hole spinneret was made in which the capillary orifices were of the five-lobed curved-slot form shown in FIGURE 16a. Three capillaries were of right-hand orientation and three capillaries of left-hand orientation. The radius of the centerline of the curved slot was 0.0087 inch, and central angle B was 160°; slot width was 0.0032 inch and the axial length of the capillaries was 0.015 inch.

The test spinneret was installed in a standard melt-spinning machine for Nylon-66 as in Example I. A comparison six-hole spinneret, in which each orifice was composed of five equispaced radial slots 0.003 inch wide by 0.026 inch long, was installed in the same spinning head to produce ordinary five-lobed filaments with five-fold planar symmetry and axial symmetry. Molten Nylon-66 containing 0.6% $TiO_2$ delusterant and having a relative viscosity of 39 was extruded through the spinnerets at 292° C.

The filaments were wound up individually on bobbins at a speed of 517 y.p.m. The filaments were cooled by a cross flow of 20° C. air at a linear rate of 60 ft./min. Average jet velocity of polymer flowing through each test orifice was approximately 43.5 ft./min. and the deviation coefficient of each test orifice was 3.64. The average denier of the individual spun filaments was 59.

As cooling air blew across the filaments, false twist tended to accumulate above the pin guide over which the solidified filaments passed. The conventional five-lobed filaments from the comparison control spinneret showed the usual random fluctuation in twist and twist reversal. With a stroboscopic light the test filaments were seen to be more stable in twist generation and the left-hand and right-hand filaments had a different visual aspect. When all six of the filaments from each of the spinnerets were combined into a single six-filament threadline at the pin guide, the difference in twist was more apparent. The filaments from the control spinneret showed the usual random accumulation and release of false twist, four or five filaments or even all six frequently twisting together and releasing sporadically.' The skewed-lobe test filaments showed much less abrupt release of twist; the three left-handed filaments tended to twist together in a single three-filament bundle above the pin guide and the three right-hand filaments tended to twist together to form a separate three-filament bundle. All of these observations confirm the view that filaments of the invention tend to develop unidirectional twist, and the left and right-hand filaments twist in opposite directions.

Prior to the windup bobbin, the individual filaments from each spinneret pass lightly over a slowly rotating finish application roll made of Carborundum and covered with a regenerated thin film of lubricating finish emulsion. Filaments are spaced nominally about ¼" apart on the finish roll. The comparison control filaments tended to "crawl" laterally, sometimes striking against a neighboring filament. Test filaments showed very little evidence of lateral crawl, the spacing between the filament changing very little in the course of time. This behavior is a very sensitive indication that filaments of the invention tend to rotate more easily and uniformly than normal symmetrical lobed filaments when passing over guide surfaces.

Cross-sectional photomicrographs were made of test and control filaments. The section of test filaments was very similar to that illustrated in FIGURE 12a and had an average deviation coefficient of 1.20. The section of control filaments was quite similar to that illustrated in FIGURE 12b.

Samples of test and comparison control monofilaments were drawtwisted on a standard Whitin RG–4 drawtwister to provide 15 denier drawn filaments. Ladies' hose were knitted on a circular knitter using each type of yarn.

Examination of the greige hose showed that the test hose had less luster and appeared more opaque than the control hose. The luster of the right-hand filament hose differed slightly from that of the left-hand filament hose when viewed from about the same angle. There was a discernible difference in the handle of the test hose compared with the control, test hose seeming slightly less harsh but more crisp.

EXAMPLE V

Another six-hole spinneret was made to produce samples of seven-lobed skewed filaments. Three orifices were made with the right-hand curved slot configuration illustrated in FIGURE 17; arc radius of the slot centerline was 0.0135 inch, central angle B was 140°, slot width was 0.003 inch, and deviation coefficient of the orifice was 5.3. The other three orifices were designed to produce normal seven-lobed filaments having seven-fold planar symmetry, and consisted of seven equispaced straight slots radiating from a common intersection; slot width was 0.003 inch and slot length was 0.033 inch.

The test spinneret was installed in the same spinning machine and under the same conditions mentioned in Example IV. Polymer jets from the three conventional straight-leg orifices were very stable. Jets from the three skewed test orifices were periodically unstable, two or more lobes frequently coalescing together trapping air bubbles within the filament. For demonstration purposes, however, the spinning conditions were altered until operable jets were attained. Spinning speed was reduced to 460 y.p.m. and spinning unit temperature was increased to reduce the viscosity of the molten polymer. Under these conditions, test and comparison filaments were observed. Results were similar to those noted in Example IV for five-lobed filaments. The test filaments showed less irregular twist generation, more stable passage over the finish roll, and yarn on the bobbin appeared less lustrous than control yarn. Photomicrographs showed that the test filament section was similar to that illustrated in FIGURE 13a but was slightly less well defined, having a deviation coefficient of 1.17; the control filament had a well formed symmetrical seven-lobed section.

It will be observed from the above description that there are many advantages of the present invention. The filaments and yarns have advantages in production, such as superior filament stability in spinning and freer movement over guide surface as compared to multilobal planarly symmetrical section filaments. The present filaments also exhibit high natural bulk which in multifilament yarns can be varied by the kind of twist as well as by degree of twist, and by mixing left-hand and right-hand filamentary forms in the same yarn bundle. Furthermore, the filaments have flexural characteristics which impart superior resilience and tactile qualities to fabrics composed of such filaments. The skewed section yarns of the invention are particularly well adapted to bulking by the twist-set method, fluid disturbance method, the hot-stretch gear-crimp method, and the stuffer-box method.

The spinnerets can be readily manufactured by commercial methods. The orifices in the spinnerets can be arranged to produce yarns composed of all left-hand or all right-hand filament sections or these filaments mixed in any proportion.

What is claimed is:

1. A threadline composed of a plurality of textile filaments having a cross-section of three, five, seven or nine lobes, the lobes of which are substantially equally spaced about the center thereof and are substantially uniformly bent in one direction along the length of the filaments, said filaments each having a corresponding multiple of axial symmetry and presenting neither planar symmetry nor radial symmetry, at least 10% of the filaments having their branches inclined in a direction opposite to the direction of inclination of the branches of the other filaments.

2. The threadline of claim 1 wherein the filaments are melt spun from a nylon polymer.

3. The threadline of claim 1 wherein the filaments are melt spun from a polyester polymer.

4. A textured threadline of a plurality of filaments in claim 1.

5. A threadline composed of a plurality of textile filaments having a triskelion cross section, the three branches of which are substantially equally spaced about the center thereof and are substantially uniformly bent in one direction; said filaments being further characterized by having threefold axial symmetry, presenting neither planar symmetry nor radial symmetry, and having a deviation coefficient of 1.10 to 1.85.

6. A threadline composed of a plurality of textile filaments having a cross section of five lobes, each of which are substantially equally spaced about the center thereof and are substantially uniformly bent in one direction; said filaments being further characterized by having fivefold axial symmetry, presenting neither planar symmetry nor radial symmetry, and having a deviation coefficient of 1.10 to 1.75.

7. A threadline composed of a plurality of textile filaments having a cross section of seven lobes which are substantially equally spaced about the center thereof and are uniformly bent in one direction; said filaments being further characterized by having sevenfold axial symmetry, presenting neither planar symmetry nor radial symmetry, and having a deviation coefficient of 1.15 to 1.70.

8. A threadline composed of a plurality of textile filaments having a cross section of nine lobes which are substantially equally spaced about the center thereof and are uniformly bent in one direction; said filaments being further characterized by having ninefold axial symmetry, presenting neither planar symmetry nor radial symmetry, and having a deviation coefficient of 1.20 to 1.65.

References Cited

UNITED STATES PATENTS

| | | | |
|---|---|---|---|
| 2,002,153 | 5/1935 | Mendel | 57—140 |
| 2,637,893 | 5/1953 | Shaw | 161—177 |

MORRIS SUSSMAN, *Primary Examiner.*

W. A. POWELL, *Assistant Examiner.*

U.S. Cl. X.R.

117—115, 120; 118—7, 117, 419